UNITED STATES PATENT OFFICE.

JOHN SOLTER AND HENRY R. ROBBINS, JR., OF BALTIMORE, MARYLAND, ASSIGNORS OF ONE-THIRD TO JOHN J. SHEPPARD, OF SAME PLACE.

PREPARED CEREALS AND MODE OF PRODUCTION.

SPECIFICATION forming part of Letters Patent No. 341,355, dated May 4, 1886.

Application filed March 17, 1886. Serial No. 195,606. (No specimens.)

*To all whom it may concern:*

Be it known that we, JOHN SOLTER and HENRY R. ROBBINS, Jr., of Baltimore, in the State of Maryland, have invented a new and useful Improvement in Preparation of Cereals; and we do hereby declare that the following is a full, clear, and exact description of the same.

Our invention relates to the preparation of cereals to be used for food or in brewing, or for other purposes for which said products are adapted.

The process hereinafter described is designed especially for the treatment of Indian corn or the artificial product hereinafter described—samp or hominy—made from that natural product.

The object of our invention is to reduce the natural product to a condition in respect to form and quality best fitted in respect to its solubility and otherwise to the processes required for the purpose above specified, and at the same time to retain all the starchy or more soluble constituents in the cereals without loss or deterioration.

The invention consists both in the process and in the article.

Heretofore Indian corn has been treated by first reducing it to what has been for a long time known in the trade as "samp" or "hominy," then steaming for the purpose of softening and toughening the granules of same without cooking, and afterward passing through heated rollers, whereby the granules of samp were pressed into flakes. In this process the uncooked granules are pressed or crushed by passage between rollers, and by this mechanical operation, while in a moist state, are reduced to a condition adapting them readily to be dissolved or cooked, according to the uses to which they are afterward put; but in passing these granules between rollers the more soluble or starchy parts would be pressed out from the tougher portions, the latter passing through the rollers and leaving the soluble or semi-liquid parts behind. This occasions a material percentage of loss of the substance of the product. At the same time the product is less thoroughly soluble and less readily prepared by reason of its uncooked condition.

A process has also been heretofore shown in the United States Patent of D'Heureuse, No. 198,192, for treating corn and other cereals, the same consisting in boiling the cereal in water, then grinding, and finally running into molds. The boiling removes the soluble parts and renders it impossible to pass the product thus cooked through a mill without loss. It can only be run into molds, in which it sets, and is then cut up and dried. This requires additional handling, and it is desirable to have the material issue from the mill in shape and condition in which it may be easily and directly dried, and in which it may be in more comminuted form and more available for use. We have sought to obtain these results by the process hereinafter described.

In cooking the material to be treated by our process one point to be attended to is a prompt operation of cooking without loss of any of the soluble parts of the material, and the second is to cook the grains or granules—such as samp or hominy—without disintegrating them or destroying the form or coherence of the granules. We have performed this operation of cooking successfully in respect to the points indicated above by subjecting the material to steam heat inclosed in a wire cage inside of the ordinary process-kettle. It will be obvious that as it is desirable to have all the grains or granules preserved intact during the cooking operation, it will be desirable to cook the mass equally and uniformly throughout. In cooking in a process-kettle, when the material is inclosed in a wire cage, if the material be introduced into the cage in a dry condition, and the full force of steam be applied suddenly thereto, there is liability that the outside will become affected first, and thereby the outside of the mass be clogged and the action of the steam be prevented from reaching fully the interior of the mass when the outside is properly cooked. This might leave the material in the interior of the mass not sufficiently moistened or cooked, and would tend to produce meal in the grinding, which we wish to avoid. We have found that it is advantageous to put dry hominy or other material into the cage to the extent of about one-third its depth, then upon the top of that put moistened hominy to the depth of another third, and upon that, and filling the kettle, the dry hominy again. In this way the interior of the mass is moistened at the outset before the steam is admitted. We have also found that we may distribute the steam through the mass uniformly and effectually for the purpose required by placing small tubes made of wire-gauze into the mass of granules placed in the bottom of the cage, and then filling the cage around these tubes with the material to be cooked. The wire tube conducts the steam to the interior uniformly among the mass. We may use any kind of cage built with tubes on this principle. We may moisten all the grains or granules before placing them in the kettle; but we avoid soaking the material in hot water, or any soaking which would dissolve out any of the soluble portions, thereby occasioning a loss of such portions. It will be understood that in the cooking the moisture applied through the steam is not sufficient to effect such a dissolution.

In respect to the amount of heat and pressure when the material is cooked in the process-kettle, the operator may with a little care readily understand this matter without further instructions; but the cooking must not be carried to a point or extent sufficient to reduce the grains or granules of pieces of corn to a mass or mush, or to cause them to lose their form. It must be sufficient only to cook them in the condition of grains or granules or broken pieces, and to leave them in a soft tough condition. We have found that this may be accomplished by cooking a mass of one hundred pounds in a process-kettle with a pressure of twenty pounds of steam to the square inch in about fifteen or twenty minutes.

In respect to the moisture introduced, it must be sufficient, in connection with the cooking, to soften and toughen the grains, granules, or broken pieces of corn, and the cooking, whether performed in a closed or open process-kettle or jacketed kettle, or however performed, must leave the granules of samp or hominy entire, and in a softened but still tough and coherent condition. When the mass thus cooked is removed from the process-kettle, it is more or less coherent by reason of the grains sticking together, and it is desirable, in order to increase the toughness of the grains, that they be somewhat cooled, and we therefore empty the cage into a sack, trough, or other vessel, and while the material is in the sack or other vessel it is manipulated or agitated, so as to separate the grains from each other, and then the grains are emptied from the bag into the hopper of the mill. The mill which we pass the material through may be an ordinary metal mill, or a mill having grooved stones, such as those used to grind ordinary grains. In passing through the mills the softened and toughened granules are forced outward through the grooves of the grinding-surface in stringy form, but without any material rupture or division of said granules. Each remains distinct and separate without loss of any of its substance, but is changed in form from a granule or fragment of the broken grain to an elongated form which is rough and spongy. It is afterward dried, and retains the form given it by the mill—that is to say, the elongated form in each granule—but is rough, light, and porous, like parched corn, and sufficiently tough to be handled without breaking up. The material being forced through or along the grooves, the more solid or tougher parts are not separated from the liquid or semi-liquid parts, but all are forced with equal facility together in mixture, and thus the material is deprived of no part of its starchy ingredients, and is in quality of greater value than any similar product heretofore known to us. At the same time the stringy or coralline form and light and spongy condition are well suited for the purpose for which they are intended, as heretofore explained. As stated, the material is dried after it has been through the mill, and this is done, preferably, by steam heat, but may be done in any well-known way.

The spirit of our invention does not require that the grinding be carried out in a mill of the ordinary kind; but any mill the surfaces of which are grooved and adapted to pass the material through the grooves in a stringy or attenuated form, in contradistinction to a flaky form caused by pressure through rollers, will serve the purpose equally as well. The softening and cooking require some moisture, and it is immaterial how this is introduced. When the material is in the proper condition and in the granular form, it will pass through the mill without clogging, and the grains issue for the greater part separately, but in the stringy form, which, when dried, assume what we call a "coralline shape."

We are aware that cereals have been reduced by cooking to a plastic consistency and passed through a perforated plate upon a moving sieve, where it is dried, the product being formed into a "mass of irregularly-interlacing fibers, each adhering to the others where they cross," and we do not claim that product. In our invention the grains are kept separate, and, not being made from a mush or plastic condition, are, both from their loose separate form and spongy light condition, more readily used both in cooking and brewing.

Having thus described our invention, what we claim, and desire to secure by Letters Patent, is—

1. The hereinbefore-described process of treating cereals in the form of hominy or samp, consisting, first, in cooking the product in a moistened condition to a point at which it still retains the granular form, then passing the same, in its moist condition, through a grinding-mill, and finally drying it, substantially as described.

2. The hereinbefore-described product from Indian corn, consisting of separate grains in a stringy or coralline form and cooked and dried condition, substantially as described.

In testimony whereof we have signed our names to this specification in the presence of two subscribing witnesses.

JOHN SOLTER.
HENRY R. ROBBINS, JR.

Witnesses:
W. C. DUVALL,
F. L. MIDDLETON.